United States Patent [19]

Miyake

[11] Patent Number: 4,717,969
[45] Date of Patent: Jan. 5, 1988

[54] APPARATUS FOR DETECTING SERVO-LOCK STATE IN ROTATION OF ROTARY RECORDING MEDIUM

[75] Inventor: Izumi Miyake, Kaisei, Japan

[73] Assignee: Fuji Photo Film Co., Ltd., Kanagawa, Japan

[21] Appl. No.: 738,309

[22] Filed: May 28, 1985

[30] Foreign Application Priority Data

May 28, 1984 [JP] Japan .................................. 59-106536

[51] Int. Cl.$^4$ ............................................ H04N 5/781
[52] U.S. Cl. ..................................... 358/322; 358/338; 358/906; 358/342; 360/73
[58] Field of Search ............... 358/310, 335, 342, 322, 358/338, 906, 909; 360/73, 35.1; 369/32

[56] References Cited

U.S. PATENT DOCUMENTS

| 4,439,849 | 3/1984 | Nabeshima | 358/338 X |
| 4,485,337 | 11/1984 | Sandusky | 360/73 X |
| 4,603,412 | 7/1986 | Yamazaki | 358/338 X |

*Primary Examiner*—Robert L. Richardson
*Attorney, Agent, or Firm*—Birch, Stewart, Kolasch & Birch

[57] ABSTRACT

A servo lock or sync detecting apparatus is provided for an electronic still camera system. When the images captured and recorded with such a still camera system are reproduced in a separate television system, for example, stable disk rotation is essential for achieving a stable image reproduction. To this end, a servo lock detecting apparatus is provided in which timing signals are generated as a function of the rotational speed of the magnetic disk, and a driving device for driving the disk is controlled by a control unit. The control circuit counts the periods of the timing signals using reference clock signals to produce servo lock signals when the timing signal periods are within a preset range for a preset number of times. The servo lock signals indicate that the servo lock or sync is established in the driving device.

14 Claims, 10 Drawing Figures

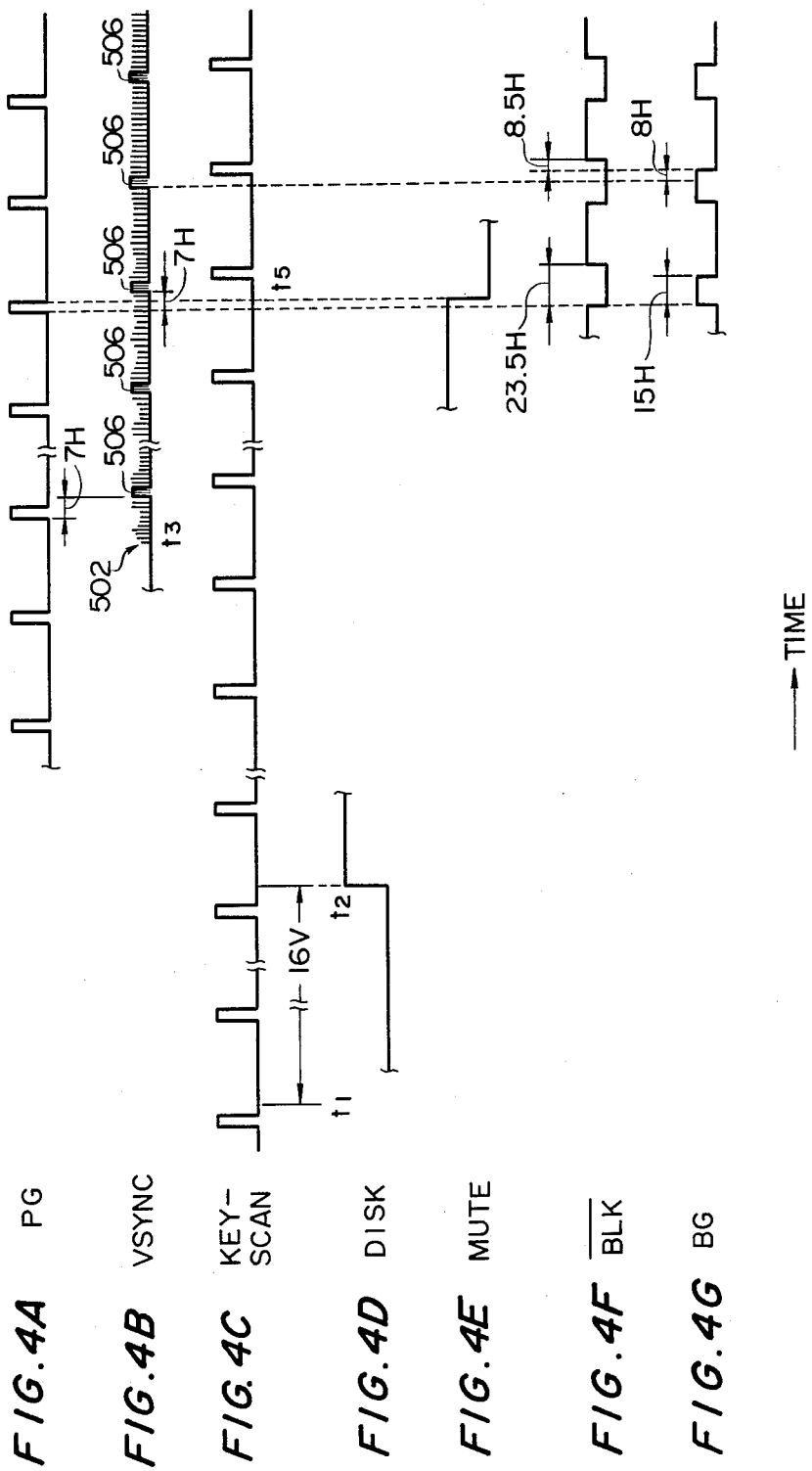

APPARATUS FOR DETECTING SERVO-LOCK STATE IN ROTATION OF ROTARY RECORDING MEDIUM

BACKGROUND OF THE INVENTION

1. Field of the Invention

This invention relates to a recording apparatus, and more particularly to a servo-lock detecting device used in such apparatus for detecting when a rotary servo unit adapted for achieving a steady-state rotation of a magnetic recording medium is in its locked or synchronized state.

2. Description of the Prior Art

There has recently been evolved an electronic still camera system which includes an image pickup device, such as a solid-state imager or image pickup tube, combined with a magnetic disk with a larger storage capacity as an inexpensive recording medium to electroncally capture and record a still image of an object on the recording disk, so that the recorded image is reproduced on a separate television system or printer.

The rotary magnetic recording member used in such an electronic still camera system is a disk with a diameter of 50 mm on which are recorded 50 tracks with a track pitch about equal to 100 μm, that is, with a track width about equal to 50 to 60 μm and a guard band width about equal to 50 to 40 μm. In the recording or reproduction apparatus, the magnetic disk is revolved at a constant speed of e.g. 3600 r.p.m. to effect recording or playback of video signals at the field or frame rate.

Such a small-sized magnetic disk of the small diameter and thickness is usually contained in a package molded of synthetic material. That is, the disk is loaded in position in a recording or reproducing apparatus, while contained in the package, to be driven in rotation in this loading position or station for recording or reproduction.

With the small-sized magnetic disk, a stable disk rotation is essential in order to effect stable recording and reproduction.

For example, in an image reproducing apparatus, the temporal base of the operations of the apparatus in the steady state is derived from video signals reproduced from a magnetic disk track, or phase generator signals extracted from the magnetic disk core. However, during the start of the reproducing apparatus, these two kinds of signals are not produced stably so as to be used for the purpose of checking for possible lock of the servo system for rotating the magnetic disk.

SUMMARY OF THE INVENTION

It is therefore an object of the present invention to provide apparatus for detecting establishment of a steady state rotation of a recording medium, with a simpler structure.

According to the present invention, there is provided a servo lock detecting apparatus comprising driving means for driving the rotary recording medium in rotation at a predetermined speed under a servo control, signal producing means for producing timing signals in response to the rotation of said rotary recording medium, and control means for controlling said driving means responsive to said signal producing means, said control means being operative to count periods of the timing signals, and to produce servo lock signals when the counted number of said periods is within a predetermined range for a predetermined number of times, the servo lock signals indicating that the servo lock is established in said driving means.

BRIEF DESCRIPTION OF THE DRAWINGS

The objects and features of the present invention will become more apparent from the consideration of the following detailed description taken in conjunction with the accompanying drawings in which:

FIGS. 4A–4G show the operational timing of the control unit.

DESCRIPTION OF THE PREFERRED EMBODIMENT

A preferred embodiment of a servo lock detecting system in accordance with the present invention is hereinafter described by referring to the accompanying drawings.

Figure 1:
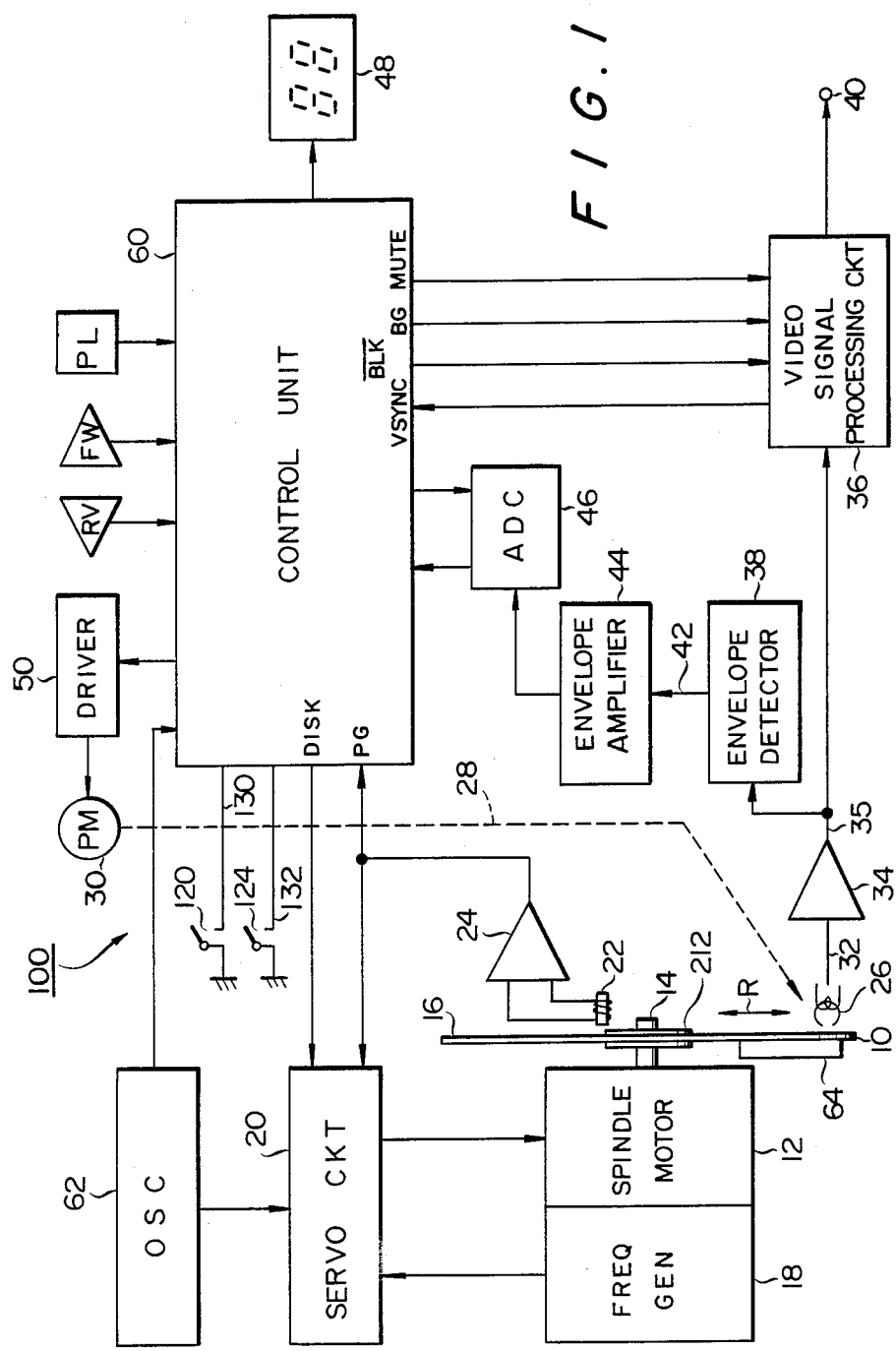
FIG. 1 is a schematic block diagram showing an embodiment of a servo lock detecting apparatus for a rotary recording medium according to the present invention.

Referring to FIG. 1, a rotary recording medium 10 such as a magnetic disk is detachably mounted to a spindle 14, which is driven in rotation by a d.c. spindle motor 12. The magnetic disk 10 is about 50 mm in diameter and formed of a sheet of the magnetic recording material. On a recording surface 16 of the disk 10 are recorded a plurality of, e.g. 50, concentric recording tracks with a pitch of e.g. ca. 100 μm with respect to the adjacent tracks. In the present embodiment, signals to be recorded on a recording track are video signals, such as color video signals including frequency modulated luminance, chrominance and synchronizing signals. These video signals are recorded in such a manner that a series of video signals that will produce one field of image on a viewing screen upon raster scanning are recorded in each track.

The d.c. spindle motor 12 is provided with a frequency generator 18 and associated with a servo circuit 20 so as to effect rotation of the disk 10 at a preset r.p.m., such as 3,600 r.p.m. under a servo control provided by the servo circuit 20. The servo circuit 20 is connected to a control circuit 60 for controlling the driving in rotation and the halt of the disk 10 in response to signals DISK, which is supplied from the control circuit 60. The circuit 60 takes charge of the overall control of the servo-lock detecting apparatus.

Figure 2:
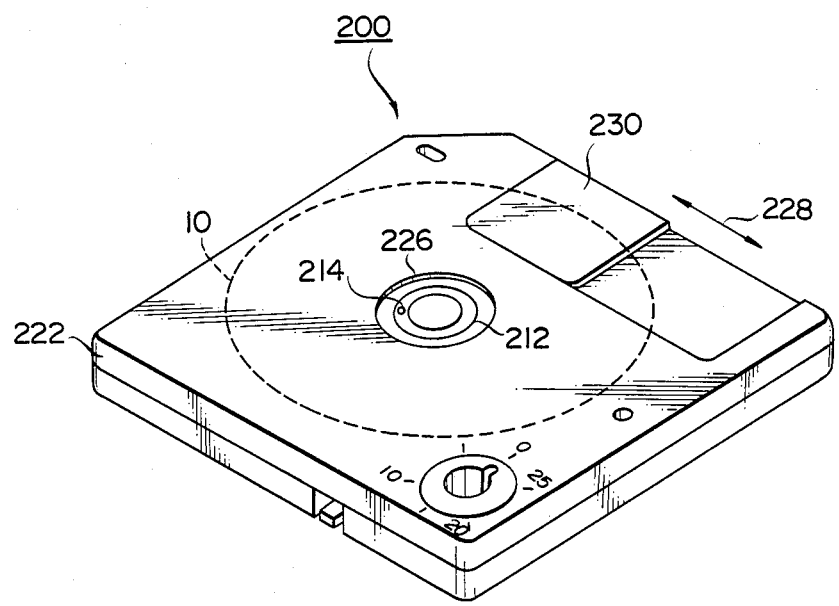
FIG. 2 is a perspective view showing an example of a magnetic disk package that may be used with the apparatus shown in FIG. 1.

A phase generator 22 is provided at a predetermined position in the vicinity of the recording surface 16 of the disk 10, and connected via an amplifier 24 to the servo circuit 20 and the control circuit 60. The generator 22 senses a timing indicia 214, FIG. 2, provided at a predetermined position on a core 212 for producing timing pulses PG during revolution of disk 10.

A magnetic head or transducer 26 is supported by a support unit, symbolically indicated by a dotted line 28, to thereby be positioned on the recording surface 16. The unit 28 is driven by a stepping motor or pulse motor (PM) 30 for causing the head 26 to move in either radial directions over the recording surface 16, as schematically shown by an arrow mark R, for selecting a desired one of the tracks formed on the recording surface 26.

The magnetic head 26 of the present embodiment is provided with a playback function, that is, it senses the video signals previously recorded on the recording surface 16 to convert the same into associated electrical signals. However, the magnetic head 26 may also be designed for magnetic recording. Since the disk 10 is rotated at a constant rotational speed of 3,600 r.p.m. as described above, one-track video signals, that is, one-field frequency-modulated video signals, are reproduced by the magnetic head 26 during each disk revolution, that is, each 60th of a second. Those signals are compatible with the existent standard color television systems, such as NTSC system, subject to demodulation of the reproduced video signals.

In the present embodiment, video signals are previously recorded on the disk 10 by a separate recording system in such a manner that vertical sync signals VSYNC will be produced with a predetermined phase delay, e.g. a delay of 7H-periods, with respect to the occurence of timing indicia or mark 214, where H represents a period of horizontal scanning of raster.

The magnetic head 26 has a scanning output 32 connected via a preamplifier 24 to a video signal processing circuit 36 and an envelope detecting circuit 38. The processing circuit 36 is designed to process the video signals sensed by the magnetic head 26 to deliver output signals from an output terminal 40 in the form of composite video color signals e.g. of the NTSC format. The circuit 36 is also designed for demodulating the video signals, and extracting sync signals, such as vertical sync signals VSYNC, from the demodulated composite color video signals to supply these sync signals to the control circuit 60. The circuit 36 is also designed for receiving muting signals MUTE from the control circuit 60 to blank out video signals in the effective horizontal scanning periods to effect muting. It should be noted that the function of converting the video signals into the standard format signals is not essential to the present system, and it is only sufficient if the processing circuit 36 is capable of extracting sync signals from the video signals picked up at the magnetic head 26 to produce the processed video signals at the terminal 40 under the control of the control unit 60.

The envelope detecting circuit 38 is designed for detecting the envelope of the frequency-modulated video signals recorded on the track of the recording surface 16 to produce an associated electrical voltage at the terminal 42. The circuit 38 is connected via an envelope amplifier 44 to an analog-digital converter (ADC) 46. In the present embodiment, the ADC 46 has 256 quantumizing level steps to develop the detected voltage to the control unit 60 in the form of 8-bit digital data under demand from the control unit 60.

The control unit 60 takes charge of the control over the overall reproducing apparatus in response to the operator's commands, and may be advantageously constructed e.g. as a microprocessor system.

In the present embodiment, the control unit 60 is associated with a playback key PL instructing the start and stop of the detecting apparatus, a forward key FW for shifting the head 26 in the direction of the increasing track number, e.g. from an outer track towards an inner track, and a reverse key RV for shifting the head 26 in the reverse direction thereto. The track number entered by the keys FW or RV is visualized on a display unit 48, such as LEDs or CRT display connected to the control unit 60. The apparatus may also be provided with an audible indicator for producing alarm.

In the present embodiment, the stepping motor 30 is a 4-phase-driven pulse motor, which may be turned about 15° responsive to each driving pulse. Therefore, the motor performs a complete revolution with 24 pulses. The head support unit 28 is designed to shift the head 26 a distance equal to about 4.2 $\mu$m in the direction of the arrow R in response to each pulse supplied to the stepping motor 30. Hence, the head 26 is shifted about 100 $\mu$m by the 24 pulses supplied.

These driving pulses are supplied from a driving circuit 50, such as a current amplifier, which is designed to produce pulses for driving an excitor coil of the stepping motor 30 in accordance with an excitation pattern instructed by the control unit 60.

The control unit 60 and the servo circuit 20 are responsive to reference clocks produced by a reference generator (OSC) 62. In the present embodiment, reference signals of 60 Hz frequency, which is same as the field frequency of the raster scanning video signals recorded on the disk 10, are supplied to the servo circuit 20, whereas faster clocks, such as 3.58 MHz clock signals, are supplied to the control unit 60.

Referring to FIG. 2, a disk package 200 employed in the present embodiment is provided with an outer casing 222 for rotatably accommodating the video recording magnetic disk 10. The disk package is provided with a central circular aperture 226, through which exposed is a central hub or core 212 of the magnetic disk 10. A magnetic member 214 for exciting coil windings of a phase generator 22 is provided to a part of the core 212.

When the package 200 is mounted in position in the reproducing apparatus 100, the foremost part of an output shaft or spindle 14 of the spindle motor 12 is chucked to the core 212 so as to permit the magnetic disk 10 to rotate in the package 200.

The package 200 is provided with a shutter plate 230, which is movable in the direction parallel to the length of a side of the package 200, as indicated by an arrow 228. When the shutter plate 230 is moved towards lower right in the drawing from the position shown in FIG. 2, the subjacent opening in the casing 222 is opened to permit abutment on the magnetic disk 10 of the magnetic head 26 and a regulator plate 64 of the reproducing apparatus 60.

Referring back to FIG. 1, an electrical contact 120 is a normally open contact that is closed only when an inner bucket, not shown, for accommodating the disk package 200 is in its normal load position or station. An output terminal 130 of the contact 120 is connected to the control unit 60 so that the unit 60 is able to detect whether or not the package 200 is in its normal load position.

An electrical contact 124 is a normally open contact that is closed when the package 200 is inserted in its normal position in the inner bucket. An output terminal 132 of the contact 124 is connected to the control unit 60 so that the unit 60 is able to detect the presence or absence of the package 200.

Figure 3:
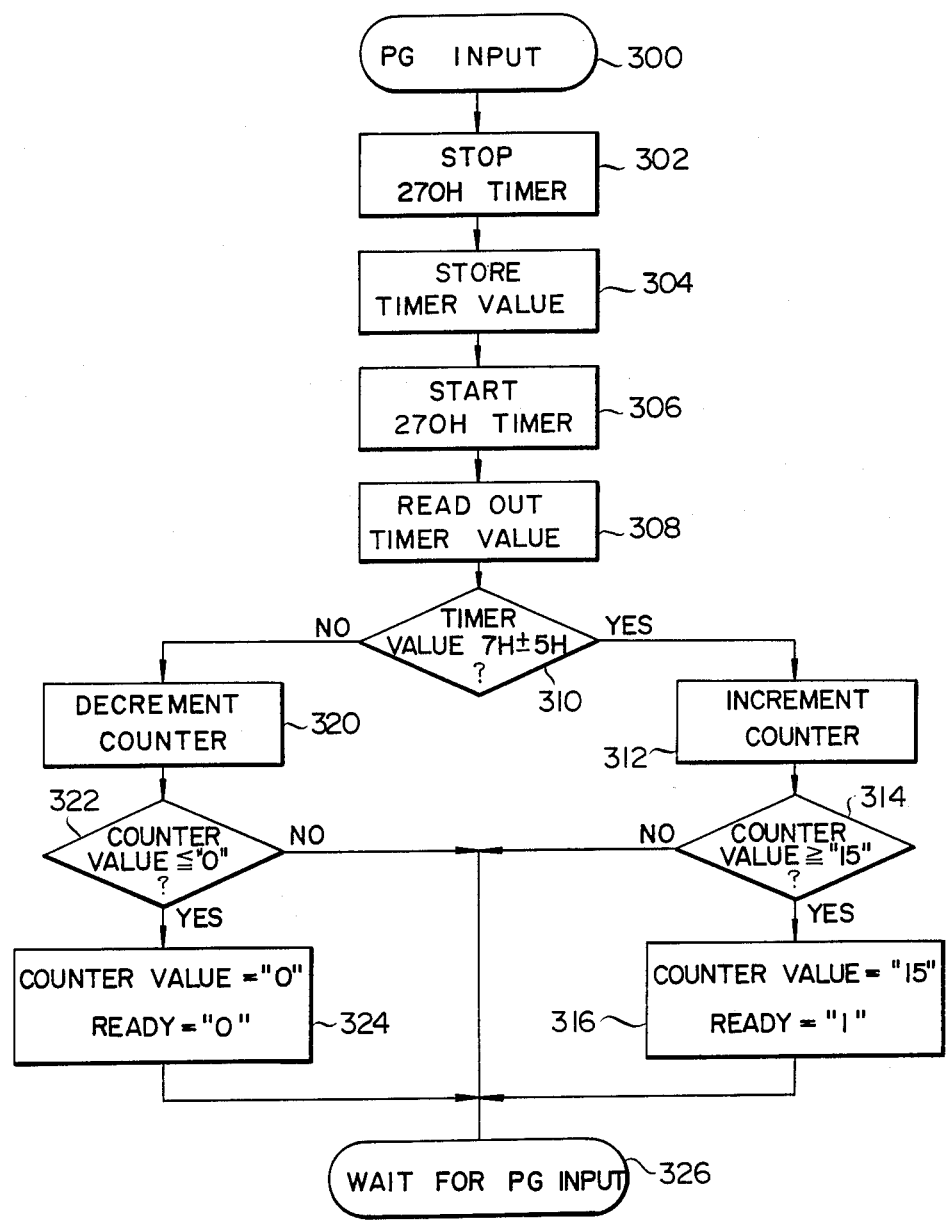
FIG. 3 is a flow chart showing an example of operating sequences of the control unit of the embodiment shown in FIG. 1.

When the package 200 is loaded in its normal position into the present detecting apparatus, the control unit 60 operates to drive the spindle motor 12 by the operational sequences shown in FIGS. 3 and 4 for detecting the servo lock or sync of the motor revolution.

The operation is based on key scan signals shown in FIG. 4C. These signals are produced at intervals of about 1/59 seconds, that is, at intervals slightly shorter than the one vertical scanning period, by counting the reference clocks supplied from the reference generator 62 to the control unit 60.

When the package 200 is inserted into the inner bucket and loaded in its normal load position, contacts 120 and 124 are closed. The control unit 60 senses the closed state of the contacts at time t1 in FIG. 4. The control unit 60 then issues a signal DISK in FIG. 4D after a preset time interval, for example, after lapse of 16 V periods, where V represents a vertical scanning period of raster. This causes the servo circuit 20 to start the d.c. motor 12 so as to set the motor into its steady state rotation at 3,600 r.p.m. on the basis of the frequency signals generated by the frequency generator 18 connected to the spindle motor 12.

When the disk 10 is set into rotation in this manner, the phase generator 22 generates a phase generator signal (PG) at each passage of the timing indicia 214 on the core 212. These signals PG are supplied to the control unit 60 and the servo circuit 20. FIG. 4A shows a series of these PG signals produced during the steady state operation. In the case of the magnetic disk 10 in which the one field video signals are recorded on each track, the period of these signals PG is equal to 1 V.

When the magnetic head 26 is positioned on a track by the operation of the stepping motor 30, video signals shown in FIG. 4B start to be picked up by the magnetic head 26, at time t3. Vertical sync signals VSYNC 506 are included in these video signals at 1 V periods, and are delayed in phase in the steady state operation by about 7H periods with respect to the PG signals.

Responsive to these PG signals, the sequences of operations shown in FIG. 3 are started. The flow sequences are started at each 1 V period since the signal PG appears at this period during the steady state operation.

The control unit 60 has a timer adapted to count a period of 270 H. The timer may be implemented in software or hardware adapted to count the number of reference clock signals supplied from the reference generator 62 for counting the period equal to 270 H in terms of the number of these clock signals. The 270 H timer is decremented at each 1 H period and, upon the issuance of the signal PG, step 300, the counting operation ceases, step 302. The control unit 60 operates to store a prevailing count in the memory, step 304, reset the 270 H timer to its initial state or 270 H, step 306, and to restart the decrementing operation at each 1 H period, step 306.

The control unit 60 reads out the count just stored in the memory, step 308, to check whether the value falls within the range of about 7 H as its center or median value with a predetermined allowance, for example, of ±5 H, step 310. Since the 1 V period is equal to 262.5 H in the present system, it is checked in the decision box 310 whether the time elapsed since the preceding PG signal until the current PG signal is about equal to 1 V, that is, within the range of 270 H ±5 H. It should be noted that, since the vertical sync signals (VSYNC) 506 included in the video signals to be sensed by magnetic head 26 are recorded during steady state operation with a phase delay of about 7 H with respect to the signals PG, the difference of 7.5 H between 270 H and 262.5 H is approximately equal to this phase difference.

If the elapsed time is within the aforesaid range, the control unit 60 operates to increment another counter for counting the number of times where the time elapsed is detected within the aforesaid range, step 312. If otherwise, the unit 60 decrements the separate counter, step 320. In the present embodiment, the sequence of operations is repeated until the value of the separate counter reaches "15".

When the counter value reaches a predetermined value, for example, "15" at step 314, the control unit 60 sets a signal READY to "1", step 316. This means that the number of occurrence of the event that the period of the signal PG is substantially equal to a 1 V period has reached "15" with the number of occurrence of the reverse event correspondingly canceling the earlier-said event, and that a servo lock is substantially achieved in the spindle motor 12.

Then, assuming that the counter value has reached "15" at time t4 in FIG. 4, the control unit 60 operates to turn off the signal MUTE in FIG. 4E to develop the video signals at the output terminal 40 through the processing circuit 36, which video signals have been sensed by the magnetic head 26 in FIG. 4B. The control unit 60 also operates to produce vertical blanking signals BLK and color burst gate signals BG on the basis of the signals PG at the timing shown in FIGS. 4F and 4G.

It is seen from above that, in the present embodiment, the periods of the signals PG or timing signals are counted in terms of reference clock signals, and the state of servo lock is assumed to be reached when the signal periods are within the preset range for a preset number of times. The counting of the timing signal periods is achieved in the present embodiment by program sequences of the control unit 60 carried out in the processing unit included therein. In this manner, the steady state of the rotation of the rotary recording medium may be detected by a simplified construction, thus providing for stable signal recording and reproduction.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. A servo lock detecting apparatus for indicating that a rotary recording medium is driven at a constant rotational velocity comprising:
    servo control driving means for driving a rotary recording medium at a predetermined rotational speed;
    signal produing means for producing timing signals in synchronism with the rotation of said rotary recording medium;
    oscillation means for developing a periodic clock period signal;
    signal processing means for processing information collected from said rotary recording medium; and
    control means, responsive to said signal producing means and said oscillator means, for controlling said signal processing means by counting the number of said clock period signals between sucessive said timing signals;
    said control means, when said number of closk pulse signals is within a predetermined range greater than one for a predetermined number of times, developing a servo lock signal indicating that the servo lock condition is established in said driving means and that said recording medium rotates at said predetermined rotational speed.

2. An apparatus according to claim 1, wherein a series of video signals associated with one field of image are recorded on a track on said rotary recording medium in such a manner that vertical periodic signals included in the video signals are shifted in phase with a predetermined phase difference ocurring with respect to each said timing signal, said control means producing the servo lock signal when the number of times the counted number of clock period signals between successive said timing signals within the predetermined range exceeds the number of times where the counted number of clock period signals is not within the range by the predetermined number of times.

3. An apparatus according to claim 1, wherein said rotary recording medium is a magnetic recording disk having a track having a video field signals recorded thereon including luminance, chroma and synchronous signals formed in a raster scanning fashion,
said clock period signals being related to a horizontal raster scan period H of said video,
said predetermined range being 7 H of said video signal ±5 H with respect thereto.

4. An apparatus according to claim 3, wherein said predetermined number of times is set to "15".

5. An apparatus according to claim 1, wherein said rotary recording medium is a magnetic recording disk, on which a video signal including luminance, caroma and synchronous signals are recorded,
said signal producing means including a timing indicia provided on said disk, and sensor means for sensing the timing indicia to produce said timing signal in response thereto.

6. An apparatus according to claim 1, wherein said rotary recording medium is a magnetic recording disk, on which a video signal including luminance, chroma and synchronous signals are recorded using frequency modulation,
said apparatus further comprising envelope detector means for detecting envelopes of the modulated video signal,
said control means being operative in response to the detected envelopes to extract the vertical periodic signals therefrom.

7. An apparatus according to claim 1, wherein said driving means includes motor means for rotating said recording medium, frequency generator means for generating frequency signals representative of the speed of rotation of said motor means, and servo control means responsive to said frequency generator means for servo controlling said motor means.

8. An apparatus according to claim 1, wherein said rotary recording medium is a magnetic recording disk, on which a video signal including luminance, chroma and synchronous signals recorded using frequency modulation,
said apparatus further comprising reproducing means for sensing the video signals on the recording medium to demodulate and develop said video signal.

9. A servo lock detecting apparatus for indicating that a rotary recording medium is driven at a constant rotational velocity comprising:

servo control drive means for driving a rotary recording medium at a predetermined rotational speed;
signal producing means for developing a timing signal in synchronism with rotation of said recording medium;
oscillator means for developing a clock period signal;
control means, responsive to said signal producing means and said oscillator means, for indicating when said rotary recording means is servo phase locked with said timing signal, said control means including,
phase timing counter means for accumulating a phase timing value representative of the number of clock signals developed between adjacent timing signals,
said control means initiating accumlation by said phase time counter means upon receipt of a said timing signal and completing accumlation upon receipt of a succeeding said timing signal, and
repeat counter means for accumlating a repeat count indicative of the number of times the count accumulated by said phase timing counter means is within a predetermined range,
said control means indicating that said rotary recording medium is phase locked with said timing signal when said repeat count exceeds a predetermined value.

10. The apparatus of claim 9 wherein said control means increments said repeat count within said repeat counter means when said count accumulated by said phase timing counter means is within a predetermined range, said control means decrementing said repeat count when said count accumulated by said phase timing counter means is outside said predetermined range.

11. An apparatus according to claim 9, wherein said rotary recording medium is a magnetic recording disk having a track having a video signal recorded thereon including luminance, chroma and synchronous signals formed in a raster scanning fashion.
said clock period signal being related to a horizontal raster scan period H of said video,
said predetermined range being 7 H of said video signal ±5 H with respect thereto.

12. An apparatus according to claim 10, wherein said rotary recording medium is a magnetic recording disk having a track having a video field signal recorded thereon including luminance, chroma and synchronous signals formed in a raster scanning fashion,
said clock period signal being related to a horizontal raster scan period H of said video,
said predetermined range being 7H of said video signal ±5 H with respect thereto.

13. An apparatus according to claim 12, wherein said predetermined number of times is set to "15".

14. An apparatus according to claim 9, wherein said rotary recording medium is a magnetic recording disk, on which a video signal including luminance, chroma and synchronous signals are recorded,
said signal producing means including a timing indicia provided on said disk, and sensor means for sensing the timing indicia to produce said timing signals in response thereto.

* * * * *